Dec. 13, 1960   R. W. WILSON   2,964,204
ARTICLE RETRIEVER
Filed Nov. 26, 1957   5 Sheets-Sheet 3
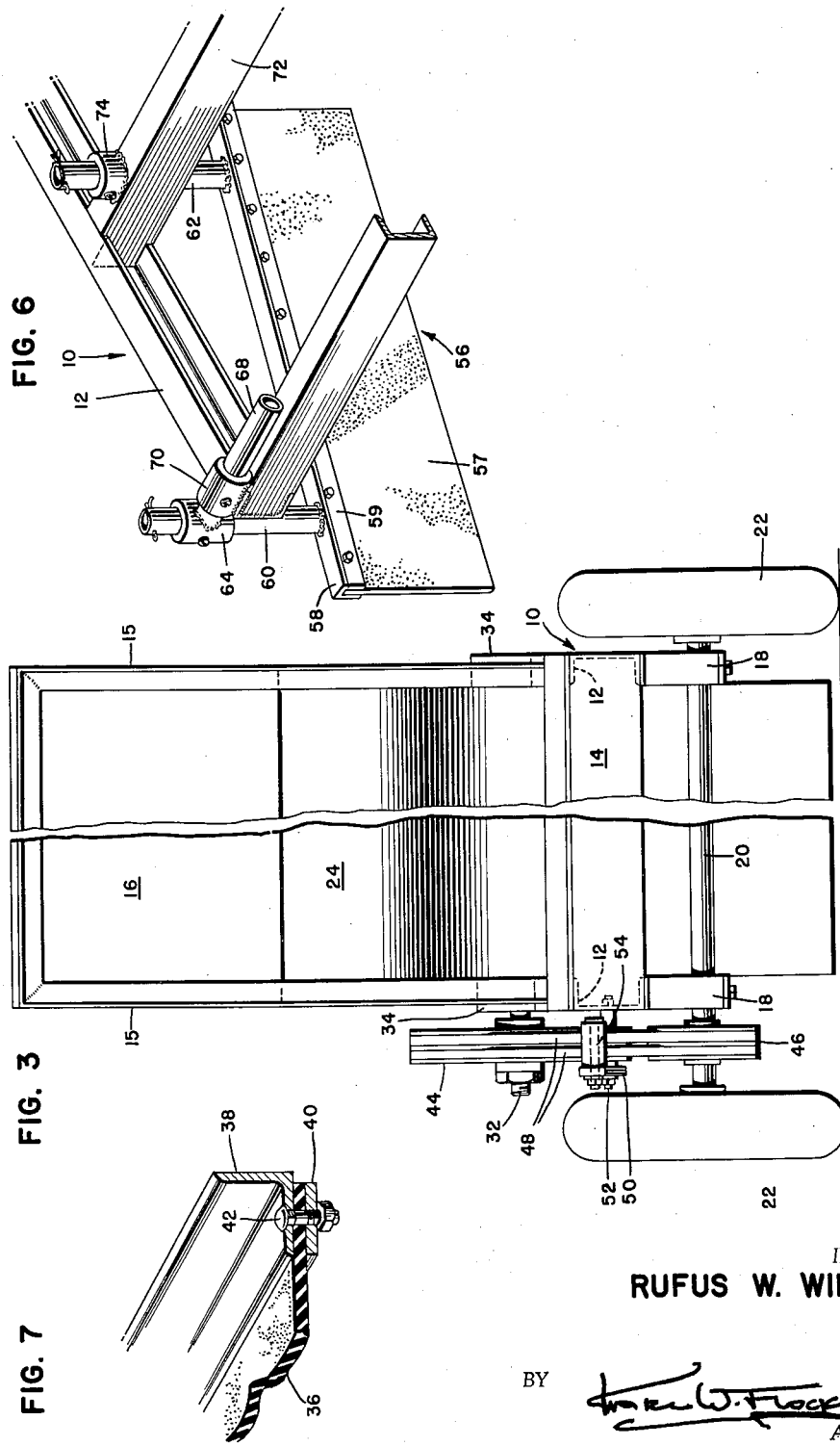
INVENTOR
RUFUS W. WILSON
BY
ATTORNEY

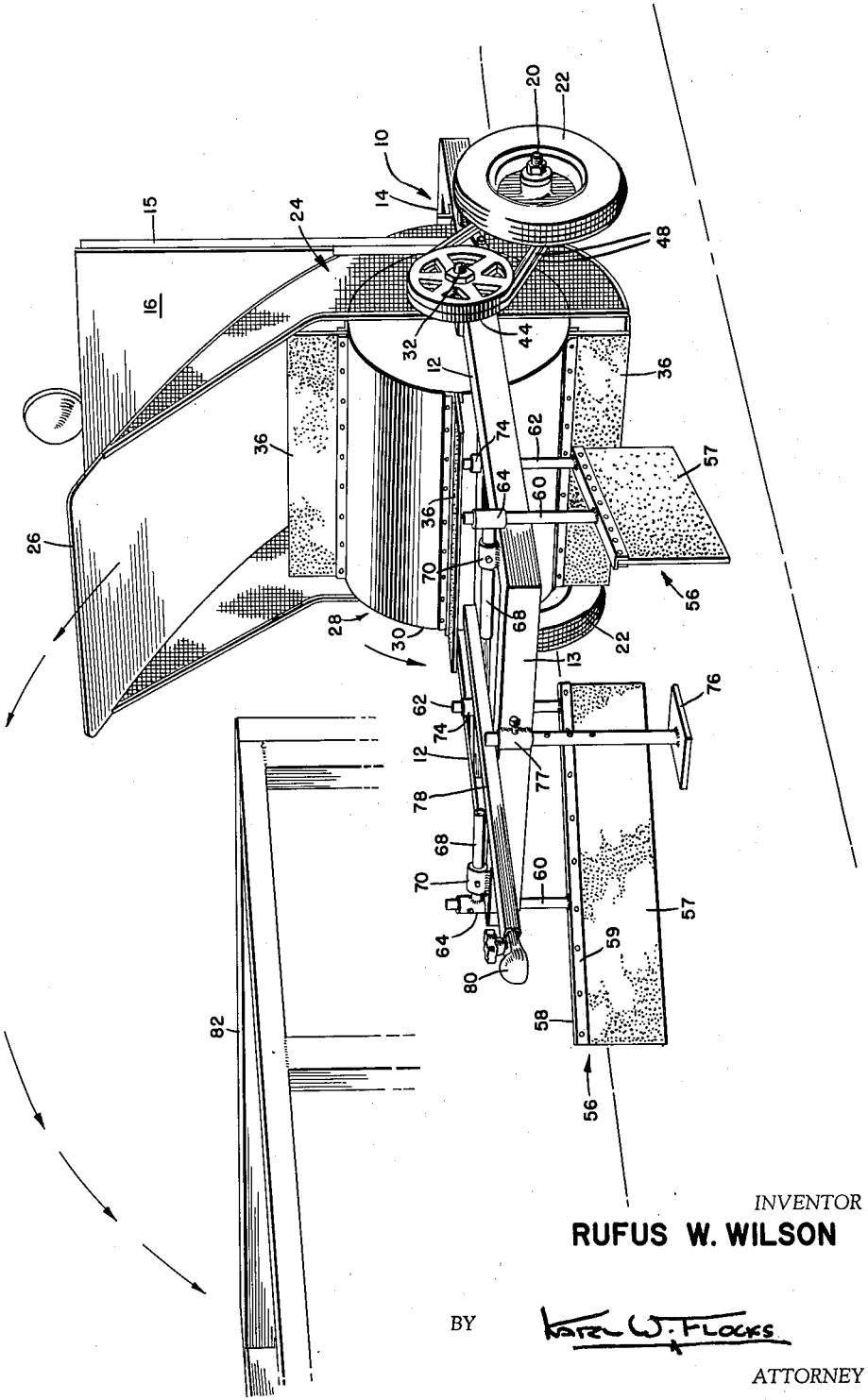
Dec. 13, 1960    R. W. WILSON    2,964,204
ARTICLE RETRIEVER
Filed Nov. 26, 1957    5 Sheets-Sheet 1
FIG. I
INVENTOR
RUFUS W. WILSON
BY
ATTORNEY

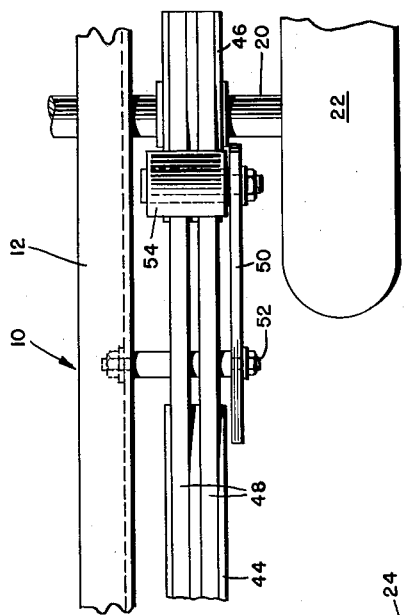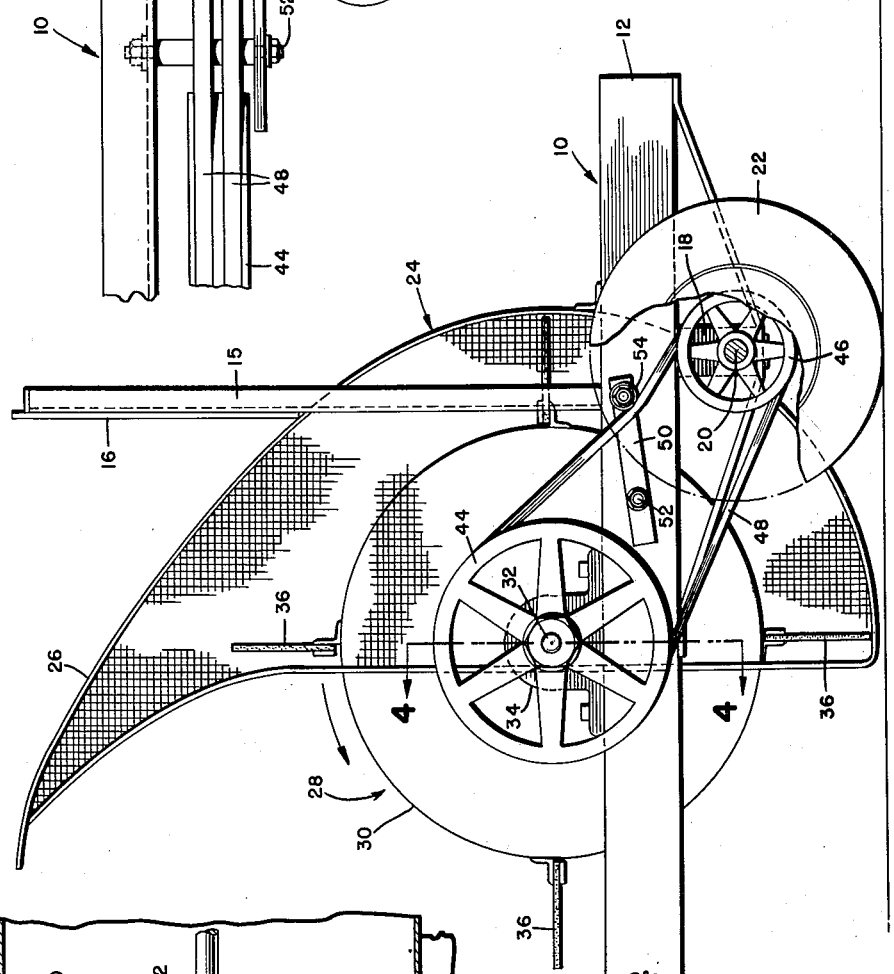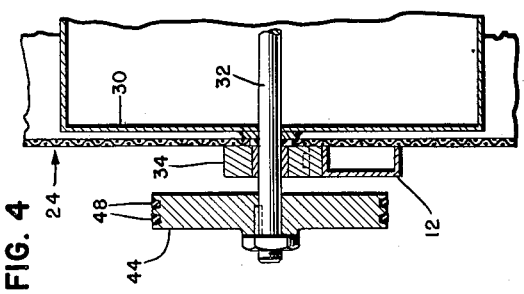

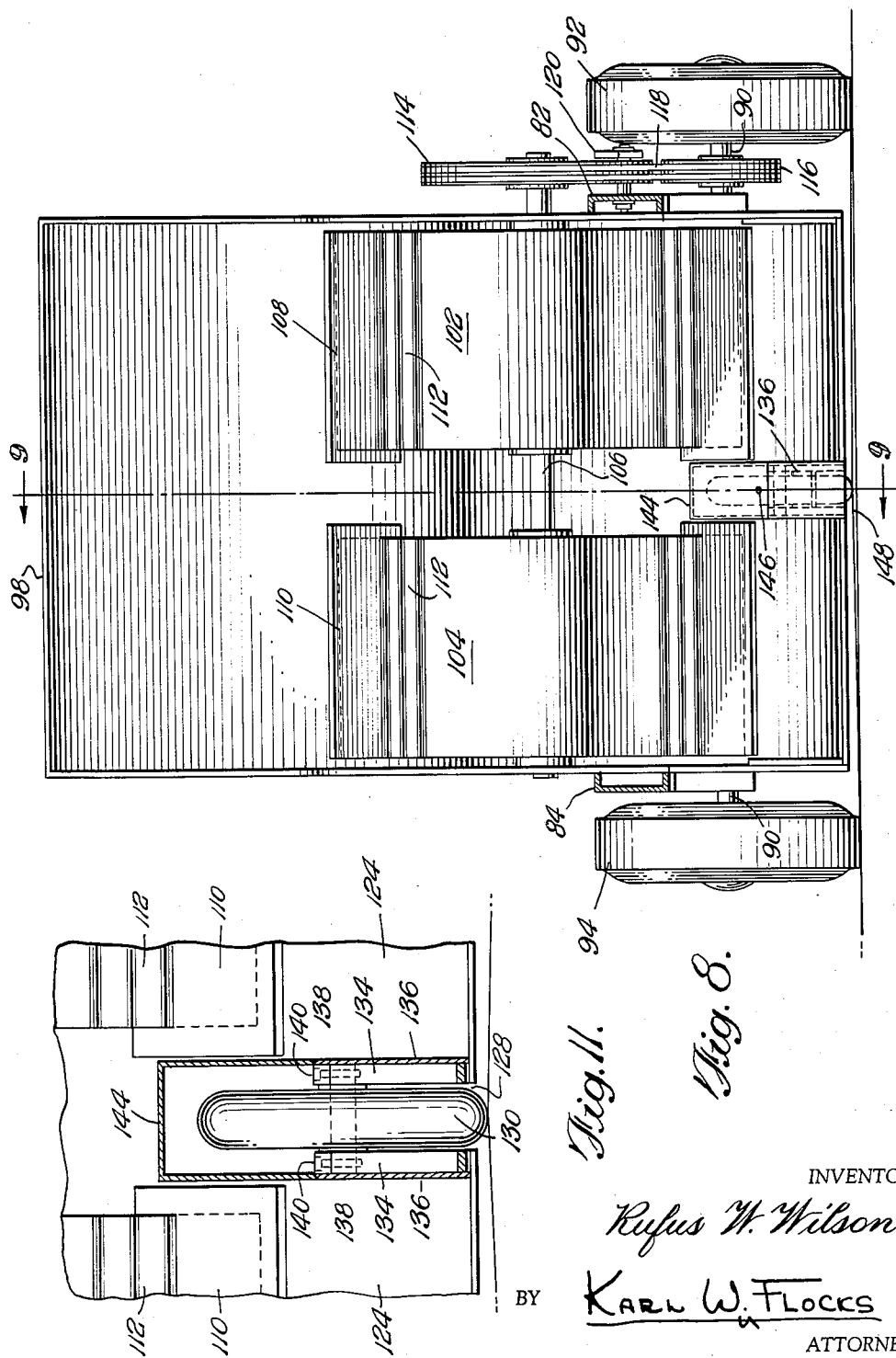

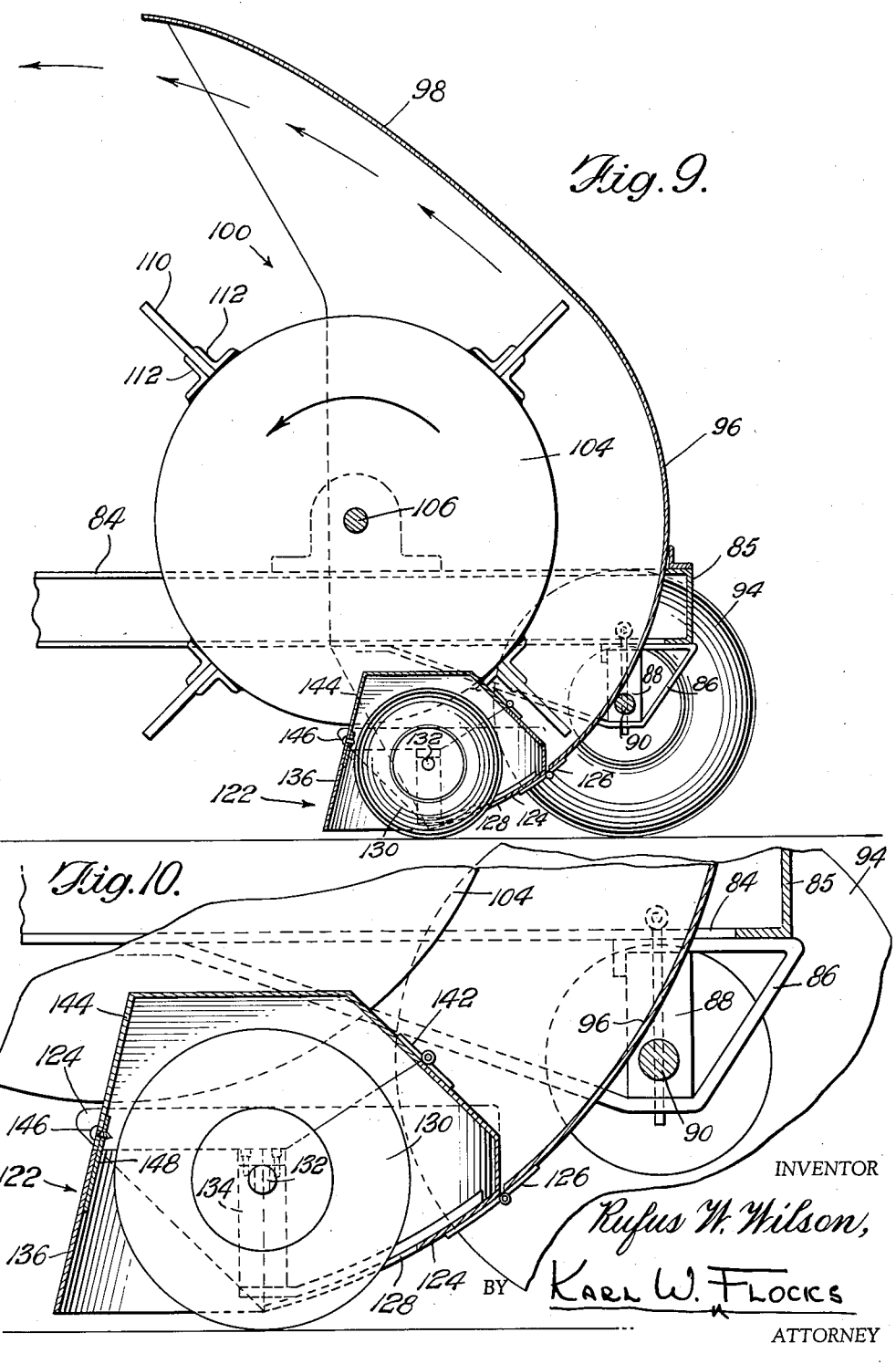

United States Patent Office 2,964,204
Patented Dec. 13, 1960

2,964,204
ARTICLE RETRIEVER

Rufus W. Wilson, Huntingdon, Pa., assignor to Wald Industries, Inc., Huntingdon, Pa., a corporation of Pennsylvania Filed Nov. 26, 1957, Ser. No. 698,974

10 Claims. (Cl. 214—355)

The present invention relates to apparatus for retrieving articles. More particularly, the present invention relates to a wheeled vehicle that is adapted to be towed or propelled along the surface of a road or the like for the purpose of retrieving small articles disposed thereon. This is a continuation-in-part of application Serial No. 463,168, now abandoned, entitled, "Article Retriever," and filed October 19, 1954.

The present invention has particular application in retrieving paint striping guards that have been placed on a road for guarding newly painted center and side stripes. It is the practice, after applying a road stripe, to protect the freshly applied wet paint from passing traffic by placing a small guard adjacent to or in straddling position over the newly painted stripe. After the paint has dried, the guard or barricade must be picked up or retrieved in some manner. Prior to the instant invention, it has been the practice in retrieving line striping guards to manually pick up the guards from the road. This is normally accomplished by having an operator located in a seat that is secured below the rear end of a truck, the seat being positioned on the side of the truck adjacent the center of the road. As the truck moves along the road adjacent the center stripe, the operator located in the seat leans over and manually picks up the guard and then throws it into the truck interior. Although this heretofore known practice of retrieving striping guards accomplishes the result, it is time-consuming since the truck must be moved at a very slow pace, and moreover, can be dangerous to the operator retrieving the barricades since he is subject to slipping from the seat during the retrieving operation.

It is therefore an object of the present invention to provide apparatus for automatically retrieving small articles from a surface or the like.

Another object of the present invention is to provide a machine for retrieving paint guards, wherein the paint guards are removed from a newly striped road and deposited in a receptacle.

Still another object of the present invention is to provide apparatus for retrieving articles from a road surface, wherein a sweeper-like device is adapted to remove the articles from the road and deposit them into a receptacle.

Still another object of the present invention is to provide wheeled apparatus for retrieving paint striping guards, wherein means are provided for positively driving the apparatus.

Still another object of the present invention is to provide a vehicle for retrieving articles from a road surface, wherein the vehicle is adapted to be secured to and propelled by a power operated vehicle.

Still another object of the present invention is to provide apparatus for retrieving articles from a road surface, the apparatus including a deflector mechanism for deflecting the articles into a sweeping device.

Still another object of the present invention is to provide apparatus for retrieving articles from a road surface, the retrieving apparatus including deflector mechanism having adjusting mechanism for adjusting the angle of deflection thereof.

Still another object is to provide retrieving apparatus that includes an adjustable scoop housing portion that is adapted to be used on high crown roads.

Still another object is to provide apparatus for retrieving articles from a roadway which includes a scoop housing that has a pivotal portion secured thereto, the pivotal portion including a separate road engaging wheel that is rseponsive to elevations and depressions and thereby prevents the scoop housing from scraping the roadway during the article retrieving operation.

Other objects and the nature and advantages of the instant invention will be apparent from the following description taken in conjunction with the accompanying drawings, wherein:

Fig. 1 is a perspective view of the article retriever embodied in the present invention illustrating the position of rest and further showing the relative position of a truck or similar power operated vehicle with respect thereto;

Fig. 2 is a side elevational view of the article retriever illustrated in Fig. 1;

Fig. 3 is a rear elevational view of the article retriever;

Fig. 4 is a sectional view taken along the lines 4—4 of Fig. 2;

Fig. 5 is a partial plan view of the drive mechanism for driving the sweeper assembly of the article retriever;

Fig. 6 is a partial perspective view illustrating the adjusting mechanism for the deflectors which deflect the articles to be retrieved toward the sweeper assembly;

Fig. 7 is a partial perspective view in section of a portion of a blade that is secured to the sweeper assembly.

Fig. 8 is a front elevational view of a modified form of the invention.

Fig. 9 is a sectional view taken along lines 9—9 in Fig. 8.

Fig. 10 is an enlarged view of a portion of the article retriever illustrated in Fig. 9; and Fig. 11 is an enlarged view of a portion of the apparatus illustrated in Fig. 7 with parts shown in section.

The article to be retrieved by the apparatus described hereinafter is specifically designed to protect a newly painted center or side road stripe and is normally formed of wood, rubber, or the like and in a block of rectangular or Z formation. The article is thus adapted to be easily picked up by the article retriever and deposited in a truck or receptacle or the like. It is, of course, understood that the present invention is not limited to retrieving guards for center stripes for roads, but may be utilized for retrieving any small article from a surface, as desired.

Referring now to the drawings, and particularly Figs. 1–3, the article retriever is illustrated and comprises a frame generally indicated at 10. The frame 10 includes a pair of spaced horizontally disposed channel beams 12 which define the sides of the article retriever and are joined at the front end thereof by a beam 13 and at the rear end thereof by a beam 14. Secured to the beams 12 adjacent the rear end thereof and extending upwardly therefrom are vertical beams 15. The vertical beams 15 may be joined at the top by a cross beam or may have secured thereto a panel, an example of which is indicated at 16. The panel 16 may have a direction indicator or the like located thereon for directing approaching traffic to the left or right of the vehicle as desired. Secured to the beams 12 and depending downwardly therefrom are journal blocks 18 which are provided with bearing openings therein for receiving an axle 20. The axle 20 is journalled in the bearing openings formed in the journal blocks 18 and is adapted to have rotatably positioned on the ends thereof traction wheels 22.

Positioned between the spaced horizontally disposed beams 12 and secured thereto adjacent the rear beam 14 is a housing 24 that has a semi-circular configuration in cross-section at the lower portion thereof, the lower portion extending into a forwardly extending portion 26 that is adapted to direct the retrieved articles into a truck or the like, as will be described hereinafter.

Positioned within the lower portion of the housing 24 and disposed in concentric relation with the semi-circular configuration thereof is a sweeper assembly generally indicated at 28. The sweeper assembly 28 includes a drum 30 which has a shaft 32 extending therethrough, the shaft 32 being rotatably mounted in journal blocks 34. The journal blocks 34 are mounted on the upper surface of the beams 12 and are positioned exteriorly of the housing 24. Secured to the periphery of the drum 30 of the sweeper assembly 28 are a plurality of vanes 36 which are adapted to sweep the article to be retrieved from the road and into the housing 24. As shown in Figs. 2 and 3, the vanes 36 extend the length of the drum 30 and are mounted on the drum 30 such that the surface thereof is perpendicular to the drum surface. The outer edge of the vanes 36 extends substantially to the inside wall of the housing 24 and thus when the sweeper assembly is rotated in the direction of the arrow shown in Fig. 2, the article to be retrieved will be moved by the vanes 36 within the housing 24 toward the forwardly extending portion 26. As shown particularly in Fig. 7, each of the vanes 36 is formed of a flexible material that has sufficient rigidity to sweep the article from the road but is also sufficiently flexible to contact the road with a sweeping action as the drum 30 rotates. Each of the vanes 36 is secured on the drum 30 between an L-channel 38 and an elongated plate 40, bolts 42 extending through the L-channel 38, vane 36 and plate 40 to lock these elements in secure engagement. The L-channels 38 may be secured to the drum 30 by some convenient means and thereby secure the vanes 36 to the drum in the manner shown.

In order to drive the sweeper assembly 28, a pulley 44 is provided and is adapted to be driven by the traction wheels 22. The pulley 44 is mounted on the shaft 32 for rotation therewith and is operatively secured to a pulley 46 through a belt drive 48, the pulley 46 being mounted for rotation on the axle 20. The pulley 44 is formed of a larger diameter than the pulley 46 and thus the speed of the sweeper assembly shaft 32 is reduced with respect to the speed of the drive axle 20 on which the pulley 46 is mounted.

In order to effect a positive drive between the pulley 46 and the pulley 44 the belt 48 is tensioned by a belt tightening device. As shown in Fig. 2, the belt tightening device comprises a bar 50 pivotally mounted on the beam 12 at 52. A roller 54 is mounted for rotation on the outer end of the pivoted bar 50 and is adapted to contact the belt 48. In operation of the device, the bar 50 is pivoted at the pivot point 52 to move the roller 54 into positive engagement with the belt 48. The belt is thereby put under tension, as shown particularly in Fig. 2, and the drive from the pulley 46 to the pulley 44 is thereby effected in a positive manner to rotate the sweeper assembly 28. It is seen that if the bar 50 is moved upwardly to remove the roller 54 from engagement with the belt 48, the belt will slip and thereby render the sweeper assembly 28 inoperative.

In order to deflect or direct the articles to be retrieved toward the sweeper assembly 28, the present invention is provided with a novel deflecting means. The deflecting means includes a pair of angularly positioned deflectors generally indicated at 56, the deflectors 56 depending from the frame 10 forwardly of the sweeper assembly and being adapted to be moved along the surface of the road and thus direct the articles to be retrieved toward the sweeper assembly. Each of the deflectors 56 includes a blade 57 formed of a rubber or flexible material which, if brought into contact with the surface of the road, will effect a sweeping action. In addition, the flexible blade will not be damaged by extraneous objects located on the road and, moreover, uneven road surfaces which are caused by sharp dips and breaks, will not damage the blade edges. The deflectors 56, which include the flexible blade 57, further include a rigid L-beam 58 that cooperates with a metal plate 59 to lock the flexible blade therebetween. In order to properly position the deflector blades 57 with respect to the road surface, vertical bars 60 and 62 are provided and are secured to the upper surface of the L-beams 58.

As shown particularly in Fig. 6, each of the vertical bars 60 of the deflectors 56 are secured within a sleeve 64 that, in turn, is secured to a bar 68. A second sleeve 70 is mounted on the beam 12 and the adjacent beam 13 and is adapted to receive the bar 68 therein. A convenient set screw is located in the body of the sleeve 70 and is adapted to positively retain the bar 68 in the sleeve 70. In order to secure the vertical bars 62 of the deflectors 56 to the frame 10, a cross bar 72 is positioned between the spaced horizontally disposed beams 12 and is provided with openings therein for receiving the vertical bars 62. Collars 74 are mounted on the upper surface of the beam 72 adjacent the openings formed therein and are provided with set screws for engaging the bars 62 to thereby secure the bars 62 in the cross bar openings. It is seen that the deflectors 56 may be conveniently adjusted in a vertical direction by moving the vertical bars 60 and 62 within the collars 64 and 74, respectively. The angular position of a deflector 56 may also be adjusted by loosening the set screws in the sleeve 70 and collar 74 and then sliding the bars 68 within the sleeve 70 so as to position the deflector 46 in the desired angular location. The set screws in the sleeve 70 and collar 74 can then be tightened to positively lock the deflector 56 in the new position.

As shown in Fig. 1, the article retriever described herein is located in the position of rest, that is, that position when it is disconnected from the vehicle to which it is normally secured when in operation. As shown in Fig. 1, a standard 76 is provided for retaining the vehicle in an upright position, the standard engaging a collar 77 joined to the beam 13 and thereby holding the frame 10 in the upper position. When the article retriever is adapted to be put into operation, the standard 76 is removed and a hitch arm 78, which is secured to the frame 10 and which includes a tongue or coupling 80, is operatively connected to the rear end of a truck or similar vehicle. Since the tongue or coupling 80 is conveniently attached to the rear of a truck, the retriever is thereby adapted to be towed by the truck during the article retrieving operation.

In the operation of the device, the article retriever is towed along a road which has been newly marked with paint or the like, guards having been placed on the road to protect the freshly applied paint. With the belt tightening or tensioning bar 50 pivoted to move the roller 52 into engagement with the belt 48, the sweeper assembly 28 is rotated and is adapted to pick up the paint guards as they are deflected thereto. The deflector blades 57 deflect the guards toward the sweeper assembly 28 and the vanes 36 of the sweeper assembly direct the guards within the housing 24. The guards are then moved within the housing 24 toward the forwardly extending upper portion 26 which acts to direct the guards toward a receptacle or truck, which is indicated at 82 in Fig. 1. Due to the velocity of the guards moving through the housing and due to the angular position of the upper portion 26, the guards are actually thrown from the housing 24 into the truck 82. It is seen, therefore, that as the article retriever moves along the road, the guards or paint barricades are automatically picked up by the sweeper assembly and are directed into the rear of the truck in a convenient manner. No manual operation is required in the operation of the device and one man can perform the job; that is, one man can drive the truck to retrieve the paint barricades or guards. If it is desired, the housing may be formed with a receptacle at the upper portion thereof so that the guards or barricades may be deposited therein. However, the present form of the invention has been found to be more practical since the guards are conveniently deposited into the truck from where they may be easily removed. If the guards extend over a wide area of the road, the deflector blades 57 may be conveniently adjusted so that the guards will be deflected toward the sweeper assembly 28, in the manner described.

Referring now to Figs. 8–11, a modified form of the invention is illustrated and includes an article retrieving apparatus that is designed to be used principally on secondary roads where high central crowns are quite common. If a fixed scoop housing were used on the apparatus on high crown roads during the article retrieving operation, it is seen that the central portion of the scoop housing would scrape the elevated portion of the road, making the use of the retrieving apparatus impractical for the retrieving operation. In order to avoid the difficulties attendant with the fixed scoop housing when used on secondary roads, the modified form of the invention is provided. As shown in Figs. 8 and 9, the modified article retriever comprises a frame that includes spaced horizontal channel beams 82 and 84, the channel beams 82, 84 being interconnected by a front beam (not shown) and a rear beam 85. Secured to the channel beams 82, 84 are supports 86 in which are mounted support blocks 88. The support blocks 88 receive a fixed wheel axle 90 therein, wheels 92 and 94 being rotatably mounted on the ends of the axle 90.

Located between the horizontal channel beams 82, 84 and fixed thereto adjacent the rear interconnecting beam 85 is a semi-cylindrical housing 96. Integrally joined to the housing 96 and projecting forwardly thereof is a directional guide portion 98 that is adapted to direct the retrieved articles into a forwardly positioned truck, which operation was described above.

Positioned within the housing 96 and disposed in concentric relation with respect thereto is a sweeper assembly generally indicated at 100. The sweeper assembly 100 includes a pair of spaced drums 102, 104 which are fixedly mounted on a common shaft 106, the shaft 106 being journalled for rotation in the side walls of the housing 96 and extending beyond the right housing wall as seen in Fig. 8. Secured to the periphery of the drums 102, 104 are a plurality of flexible vanes 108 and 110 respectively, the vanes 108, 110 being adapted to sweep the articles to be retrieved from the road and into the housing 96. As shown in Fig. 9, each of the vanes 108, 110 is secured to their respective drums by pairs of L-shaped members 112 that extend the length of each drum and receive the vanes therebetween, the members 112 being secured to the drums 108, 110 by convenient securing means.

In order to drive the sweeper assembly 100, a pulley drive is provided and includes a pulley 114 that is mounted on the extension of shaft 106 and that is interconnected to a drive pulley 116 through a belt drive 118. The drive pulley 116 is fixed to the drive axle 90 and is of a smaller diameter than the pulley 114, the speed of the sweeper assembly shaft 106 thereby being reduced with respect to the speed of the drive axle 90. A belt tensioning device 120 is also provided for more positive drive and operates similarly to the device 50 shown in Figs. 2 and 5 and described above. In order to prevent the scoop assembly from scraping the high crown center portion of secondary roads, a floating scoop or deflector assembly is provided and as shown in Fig. 10, is generally indicated at 122. The floating deflector assembly 122 includes a scoop portion 124 that is hingedly secured to the main housing 96 by a series of hinges 126. A central cut-out portion 128 (Fig. 11) is formed on the underside of the scoop portion 124 and receives a wheel 130 therein. The wheel 130 is rotatably mounted on a stub shaft 132 that is fixed in opposed support members 134, the support members 134 being secured to a fixed wheel housing 136. The wheel housing 136 is secured to the scoop portion 124 and extends into the space defined by the spaced drums 102, 104. The shaft 132 is rigidly held in position by caps 138, the caps 138 being secured to the support members 134 by pins 140. Hingedly secured to the fixed wheel housing 136 by hinges 142 is a wheelguard or cover 144, the hinged cover 144 being locked to the fixed wheel housing 136 by a screw 146. Although the nose of the cover 144 is shown flat, it is understood that the cover 144 may be formed with a round nose configuration or an inverted V-configuration as desired. As shown in Fig. 10, the screw 146 engages a plate 148 that is welded to the front inside wall of the fixed wheel housing 136 and it is seen that when it is necessary to service the wheel 130, the screw 146 is removed and the cover 144 is pivotally moved away from the fixed housing 136 to expose the wheel 130.

In operation, the wheel 130 rides on the roadway and controls the position of the pivoted scoop portion 124. If the roadway includes a crown portion such as indicated at 148 in Fig. 8, the wheel 130 moves onto the crown portion and the scoop portion 124 is thus caused to be pivoted on the hinges 126 with respect to the fixed scoop housing 96. The lower edge of the scoop portion 124 is thereby raised from the crown of the road and scraping of the road surface is prevented. The wheel 130 and pivoted scoop portion 124 secured for movement therewith thus become a floating assembly, the vertical travel of which is parallel with the longitudinal configuration of the crown of the road. It is seen that the operation for retrieving the road stripe protecting articles is continuously carried out by the apparatus shown in Figs. 8–11, the articles being retrieved by the action of the vanes 108—110 that move with the rotating drums 102, 104. The articles are thus propelled into a forwardly located receptacle by the vanes 108, 110 which rapidly move the articles into contact with the deflector or guide portion 98.

The operation of the device is simple yet effective. There are relatively few moving parts, thereby requiring little or no maintenance, and the retrieving operation may be carried out without unduly reducing the speed of the towing machine or fear of injury to any operators.

It will be obvious to those skilled in the art that various changes may be made without departing from the spirit of the invention and therefore the invention is not limited to what is shown in the drawings and described in the specification, but only as indicated in the appended claims.

What is claimed is:

1. In apparatus for retrieving solid articles from a roadway surface, a frame including wheel means and having a housing mounted thereon, said frame being operatively connected to wheeled towing means positioned forwardly with respect thereto, said towing means having a receptacle that is spaced forwardly of said housing, said housing including a lower semi-cylindrical portion the lower end of which is located in close proximity to said surface, a sweeper assembly rotatably mounted on said lower semi-cylindrical portion and including drum means spaced from said semi-cylindrical portion, a plurality of radially extending flexible vanes secured to the periphery of said drum means and contacting said surface with a sweeping action for retrieving said solid articles therefrom, said flexible vanes being adapted to move within the space defined by said drum means and said semi-cylindrical portion, an upper forwardly extending portion integrally joined to said semi-cylindrical portion and being of substantial length and extending in a generally forwardly direction to define a deflecting surface, said articles being retrieved from said roadway surface by said flexible vanes which direct said articles into said space, the rotary movement of said sweeper assembly rapidly moving said articles toward the relatively large deflecting surface from where they are propelled through free space in a forwardly direction into said receptacle.

2. In apparatus for retrieving articles as set forth in claim 1, wherein deflecting means are provided for deflecting said articles into said sweeping means, said deflecting means being vertically and angularly adjustable to compensate for dispersal of said articles on the surface from which they are retrieved.

3. In apparatus for retrieving articles as set forth in claim 2, wherein said deflecting means includes vertical bars, collars mounted on said frame and receiving said vertical bars therein, said vertical bars and collars cooperating to provide for adjustability of said deflecting means.

4. In apparatus for retrieving solid articles from a roadway surface, a frame including wheel means and having a housing mounted thereon, said frame being operatively connected to wheeled towing means positioned forwardly with respect thereto, said towing means having a receptacle that is spaced forwardly of said housing, said housing including a lower semi-cylindrical portion the lower end of which is located in close proximity to said surface, a sweeper assembly rotatably mounted on said lower semi-cylindrical portion and including drum means spaced from said semi-cylindrical portion, a plurality of radially extending flexible vanes secured to the periphery of said drum means and contacting said surface with a sweeping action for retrieving said solid articles therefrom, said flexible vanes being adapted to move within the space defined by said drum means and said semi-cylindrical portion, the diameter of said drum means being substantially greater than the radial length of said flexible vanes, an upper forwardly extending portion integrally joined to said semi-cylindrical portion and being of substantial length and extending in a generally forwardly direction to define a deflecting surface, said articles being retrieved from said roadway surface by said flexible vanes which direct said articles into said space, the rotary movement of said sweeper assembly rapidly moving said articles toward the relatively large deflecting surface from where they are propelled through free space in a forwardly direction into said receptacle.

5. In apparatus as set forth in claim 4, the forwardly extending portion of said housing projecting more forwardly than the periphery of said drum means.

6. In apparatus for retrieving solid articles from a highway surface, a frame mounted on wheel means and having a housing secured thereon, said housing being formed with a lower semi-cylindrical portion that is located in close proximity to said surface and an upper deflecting surface integrally joined to said semi-cylindrical portion and extending in a generally forwardly and upwardly direction, a sweeper assembly rotatably mounted in said lower cylindrical portion and having a plurality of radially extending flexible vanes secured to the periphery thereof for directing said articles from said surface into said housing, said lower cylindrical portion including a fixed portion and a scoop pivotally mounted on said fixed portion that defines the lowermost end thereof, and a ground engaging wheel operatively engaging said pivotally mounted scoop portion for movement therewith, said scoop portion being responsive to vertical movement of said ground engaging wheel over said highway surface to pivot with respect to the fixed portion of said lower cylindrical portion whereby contact of said scoop portion with the elevated portion of said surface is prevented.

7. In apparatus for retrieving solid articles from a highway surface, a frame mounted on wheel means and having a housing secured thereon, said housing being formed with a lower semi-cylindrical portion that is located in close proximity to said surface and an upper deflecting surface integrally joined to said semi-cylindrical portion and extending in a generally forwardly and upwardly direction, a sweeper assembly rotatably mounted in said lower cylindrical portion and having a plurality of radially extending flexible vanes secured to the periphery thereof for directing said articles from said deflecting surface into said housing, said lower cylindrical portion including a fixed portion and a scoop pivotally mounted on said fixed portion that defines the lowermost end thereof, a ground engaging wheel operatively engaging said pivotally mounted scoop portion for movement therewith, said scoop portion being responsive to vertical movement of said ground engaging wheel over said highway surface to pivot with respect to the fixed portion of said lower cylindrical portion whereby contact of said scoop portion with the elevated portion of said highway surface is prevented, and a housing fixed to said scoop portion and receiving said ground engaging wheel therein, a cover secured to said wheel housing and pivotally movable to expose said wheel when said apparatus is located in the inoperative position.

8. In apparatus for retrieving solid articles from a highway surface, a frame mounted on wheel means and having a housing secured thereon, said housing being formed with a lower semi-cylindrical portion that is located in close proximity to said surface and an upper deflecting surface integrally joined to said semi-cylindrical portion and extending in a generally forwardly and upwardly direction, a sweeper assembly rotatably mounted in said lower cylindrical portion and having a plurality of radially extending flexible vanes secured to the periphery thereof for directing said articles from said deflecting surface into said housing, said lower cylindrical portion including a fixed portion and a scoop pivotally mounted on said fixed portion that defines the lowermost end thereof, a ground engaging wheel operatively engaging said pivotally mounted scoop portion for movement therewith, said scoop portion being responsive to vertical movement of said ground engaging wheel over said highway surface to pivot with respect to the fixed portion of said lower cylindrical portion whereby contact of said scoop portion with the elevated portion of said highway surface is prevented, said scoop portion being formed with a cut-out portion at the center thereof, a wheel housing disposed in said cut-out portion and fixed to said scoop portion, said ground engaging wheel rotatably mounted in said wheel housing and extending through said cut-out portion, for engaging said ground thereby elevating said scoop portion above said highway surface.

9. In apparatus for retrieving solid articles from a highway surface, a frame mounted on wheel means and having a housing secured thereon, said housing being formed with a lower semi-cylindrical portion that is located in close proximity to said surface and an upper deflecting surface integrally joined to said semi-cylindrical portion and extending in a generally forwardly and upwardly direction, a sweeper assembly rotatably mounted in said lower cylindrical portion and having a plurality of radially extending flexible vanes secured to the periphery thereof for directing said articles from said deflecting surface into said housing, said lower cylindrical portion including a fixed portion and a scoop portion pivotally mounted on said fixed portion that defines the lowermost end thereof, a ground engaging wheel operatively engaging said pivotally mounted scoop portion for movement therewith, said scoop portion being responsive to vertical movement of said ground engaging wheel over said highway surface to pivot with respect to the fixed portion of said lower cylindrical portion whereby contact of said scoop portion with the elevated portion of said highway surface is prevented, said sweeper assembly further including a pair of spaced drums mounted on a common shaft, each of said drums having said flexible vanes attached thereto, said scoop portion including a wheel housing for mounting said ground engaging wheel therein, said wheel housing extending between said spaced drums.

10. In apparatus for retrieving solid articles from a highway surface, a frame mounted on wheel means and having a housing secured thereon, said housing being formed with a lower semi-cylindrical portion that is located in close proximity to said surface and an upper deflecting surface integrally joined to said semi-cylindrical portion and extending in a generally forwardly and upwardly direction, a sweeper assembly rotatably mounted in said lower cylindrical portion and having a plurality of radially extending flexible vanes secured to the periphery thereof for directing said articles from said deflecting surface into said housing, said lower cylindrical portion including a fixed portion and a scoop portion pivotally mounted on said fixed portion that defines the lowermost end thereof, a ground engaging wheel operatively engaging said pivotally mounted scoop portion for movement therewith, said scoop portion being responsive to vertical movement of said ground engaging wheel over said highway surface to pivot with respect to the fixed portion of said lower cylindrical portion whereby contact of said scoop portion with the elevated portion of said highway surface is prevented, said sweeper assembly including a pair of spaced drums mounted for rotation within said semi-cylindrical portion and said ground engaging wheel extending between said spaced drums.

References Cited in the file of this patent

UNITED STATES PATENTS

| | | |
|---|---|---|
| 2,160,972 | Litchy | June 6, 1939 |
| 2,213,370 | Reiter | Sept. 3, 1940 |
| 2,547,752 | Hasskamp | Apr. 3, 1951 |
| 2,587,719 | Fratini | Mar. 4, 1952 |

FOREIGN PATENTS

| | | |
|---|---|---|
| 573,102 | Great Britain | Nov. 6, 1945 |